United States Patent Office 2,823,112
Patented Feb. 11, 1958

2,823,112

FLUX COMPOUND

Jay Joseph Miller, Bedford, Pa.

No Drawing. Application April 8, 1955
Serial No. 500,265

11 Claims. (Cl. 75—94)

This invention relates to fluxes useful in metallurgical processes, and in particular to an additive compound for such fluxes. The invention relates also to processes for the separation of metals from metal containing ores, compounds and mixtures.

A principal object of the invention is to provide a compound useful as a flux additive, adapted to improve the properties and function of metallurgical fluxes. A related object is to provide a process for producing the flux additive.

Another object is to provide an improved reusable flux for use in metallurgical processes.

A further object is to provide improved methods for separating metals from metal containing ores, compounds and mixtures. Further objects will be in part evident and in part pointed out hereinafter.

I have discovered that metals may be readily separated from ores, other compounds, mixtures and alloys by melting the metal containing material with a suitable flux, whereupon the metal separates from the flux in substantially pure state in the form of a discrete, molten bottom layer, which may be separated from the flux and slag by decanting, tapping or similar conventional expedient. The process is of particular value in connection with ores and compounds of copper, manganese and iron, but may be used for the extraction of other metals as well. Compounds other than ores which may be treated include oxides and slags, and the process may be applied to particulate mixtures including silica, abrasive dust and the like.

FLUX

A suitable flux may include the following ingredients:

| | Lb. |
|---|---|
| Sodium carbonate | 5 |
| Potassium carbonate | 5 |
| Potassium bitartrate | 1 |
| Willow charcoal | 1 |
| Borax | 300 |
| Asbestos wool | 3 |
| Potassium permanganate | 5 |

These ingredients are mixed together and heated until liquified. The flux may then be poured into a mold, and when cool is glassy and brittle.

In making up the basic flux, the proportions stated for purpose of illustration are not critical, and conventional flux ingredients in the basic flux may be omitted or substituted. Fluorspar or lime, for example, may be used in place of borax. The minor amounts of asbestos and potassium permanganate, however, appear to be essential to the invention, and may not be omitted.

The flux as above described has many metallurgical uses, but I have discovered that its utility and function is enhanced and altered to a remarkable degree by the addition thereto of a minute quantity of the flux compound next to be described.

FLUX COMPOUND

The flux compound is made from the following ingredients:

| | Oz. |
|---|---|
| Cake camphor | 1 |
| Potassium bitartrate | 8 |
| Powdered willow charcoal | 2 |
| Zinc chloride | 2 |

The ingredients are thoroughly mixed and placed in a pressure vessel, such as a reaction bomb, which may be three inches in diameter and twelve inches long. The bomb is then closed and sealed, as by screwing down its cap, the cap being provided conveniently with a pressure gauge. Thereafter, heat is applied to the vessel by any conventional means, as by a Bunsen burner having a flame temperature between 1800 and 1900° C., until the internal pressure therewithin rises to within the range of from about 1500 to about 2000 pounds per square inch, and preferably to the upper end of this range. When the internal pressure reaches the indicated range application of heat is discontinued, and the vessel and contents are permitted to cool until the gauge registers zero, that is until the internal pressure drops to substantially atmospheric. The heat and pressure reaction product, which may then be removed, is a stable powder jet black in color.

While I do not understand the composition of the flux compound, nor its functional operation, I have found that it enhances the liquefaction of fluxes of the type previously described, and of metal containing materials heated therewith. It is my belief that the flux compound functions in metallurgical processes somewhat in the nature of a catalyst. At any rate, a minute quantity of this flux compound, for example one ounce, remarkably changes the properties of a large quantity of flux.

Example I

Eight pounds of copper sulphide ore was heated in a furnace together with seven pounds of the flux described. To the flux was added about one half ounce of the flux compound. The mixture was heated rapidly (in less than one hour) to a temperature of 2635° F., at which temperature it appeared to be completely melted. When cooled, the bottom layer was a discrete mass of metal weighing one pound, one ounce. This metal was found to contain 99.10% copper and 0.20% silver.

Example II

Eight pounds of manganese ore, together with seven pounds of flux and about one half ounce of the flux additive compound, was heated as previously described to a temperature of about 2675° F., at which temperature complete melting occurred. When cooled, 8½ ounces of metal was recovered, this metal being found to contain 9.06% manganese. The remainder was not analyzed, but was thought to be mostly iron.

Example III

Four pounds of iron ore (45.86% Fe) were heated in a crucible with four pounds of flux and about one half ounce of flux compound to a temperature of about 2600° F., at which temperature the mixture was completely melted. About thirty-five minutes was required to achieve the melt. On cooling, 1.8 pounds of metal was recovered, this metal having the following composition:

| | Percent |
|---|---|
| Carbon | 1.42 |
| Manganese | .24 |
| Phosphorus | .827 |
| Sulphor | .051 |
| Silicon | .37 |
| Iron | Balance |

Example IV

Two pounds of open hearth slag was heated with two pounds of flux containing a minute quantity of flux compound, to a temperature of about 2700° F., at which temperature the mixture was completely melted. On cooling, a metal mass weighing one pound, two ounces was recovered, having the following composition:

| | Percent |
|---|---|
| Carbon | 1.89 |
| Manganese | .60 |
| Phosphorus | .449 |
| Sulphor | .030 |
| Silicon | 7.85 |
| Iron | Balance |

A flux batch made up as previously described weighs approximately 320 pounds. Three ounces of flux compound according to the invention is adequate to fully activate this quantity of flux. In commercial operations, this quantity of flux with flux compound added may be utilized to separate metal from one ton of metal ore or the like. A surprising aspect of my discovery is that the flux is reusable, and may be used again and again. Dilution of the flux with slag or the like in repeated use does not appear to substantially diminish its effectiveness. Should the separation of metal thereby become less effective, it may readily be reactivated by addition thereto of another small quantity of flux compound.

It will thus be seen that there has been provided by this invention processes and compositions of matter by which the various objects hereinbefore set forth, together with many practical advantages are successfully achieved. As the invention may be utilized in many embodiments and equivalent forms, without departing from the scope thereof, it is to be understood that all matter hereinbefore set forth is to be interpreted as illustrative, and not in a limiting sense.

I claim:

1. The process of making a flux compound comprising the steps of mixing approximately one part by weight camphor, eight parts potassium bitartrate, two parts willow charcoal, and two parts zinc chloride, sealing the mixed ingredients in a vessel, applying heat to the closed vessel until the pressure therewithin reaches the range of from about 1,500 to about 2,000 pounds per square inch, discontinuing the application of heat, permitting the vessel to cool until the pressure therewithin drops to substantially atmospheric, and then opening the vessel and removing the resultant product therefrom.

2. A flux compound made according to the process of claim 1.

3. A composition of matter consisting essentially of reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

4. A metallurgical flux composed of potassium permanganate and asbestos, the ratio of potassium permanganate to asbestos being about 5:3 by weight, and a minor amount not exceeding about 1% by weight of the flux of a composition of matter consisting essentially of the reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

5. A process of separating metal from an ore comprising the step of melting said ore together with a flux containing potassium permanganate, asbestos and a minor amount not exceeding about 1% by weight of the flux of the reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

6. A process of separating free metal from a compound thereof comprising the step of melting said compound together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

7. A process of separating free metal from a mixture thereof comprising the step of melting said mixture together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

8. A process of separating metallic copper from copper ore comprising the step of melting said ore together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

9. A process of separating manganese from manganese ore comprising the step of melting said ore together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

10. A process of separating metallic iron from iron ore comprising the steps of melting said ore together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

11. A process of separating iron from open hearth slag comprising the steps of melting said slag together with a flux containing potassium permanganate, asbestos and a minor amount not exceeding about 1% by weight of the flux of the heat and pressure reaction product of one part by weight camphor, eight parts potassium bitartrate, two parts willow charcoal and two parts zinc chloride, said reaction being carried out at high temperature and a pressure within the range of from about 1,500 to about 2,000 pounds per square inch.

References Cited in the file of this patent
UNITED STATES PATENTS

| | | |
|---|---|---|
| 319,128 | Rosenberg | June 2, 1885 |
| 1,312,154 | Bonsteel | Aug. 5, 1919 |
| 1,401,154 | Hess | Dec. 27, 1921 |
| 1,893,499 | Jeavons | Jan. 10, 1933 |
| 2,111,032 | Nielsen | Mar. 15, 1938 |